Patented Dec. 7, 1937

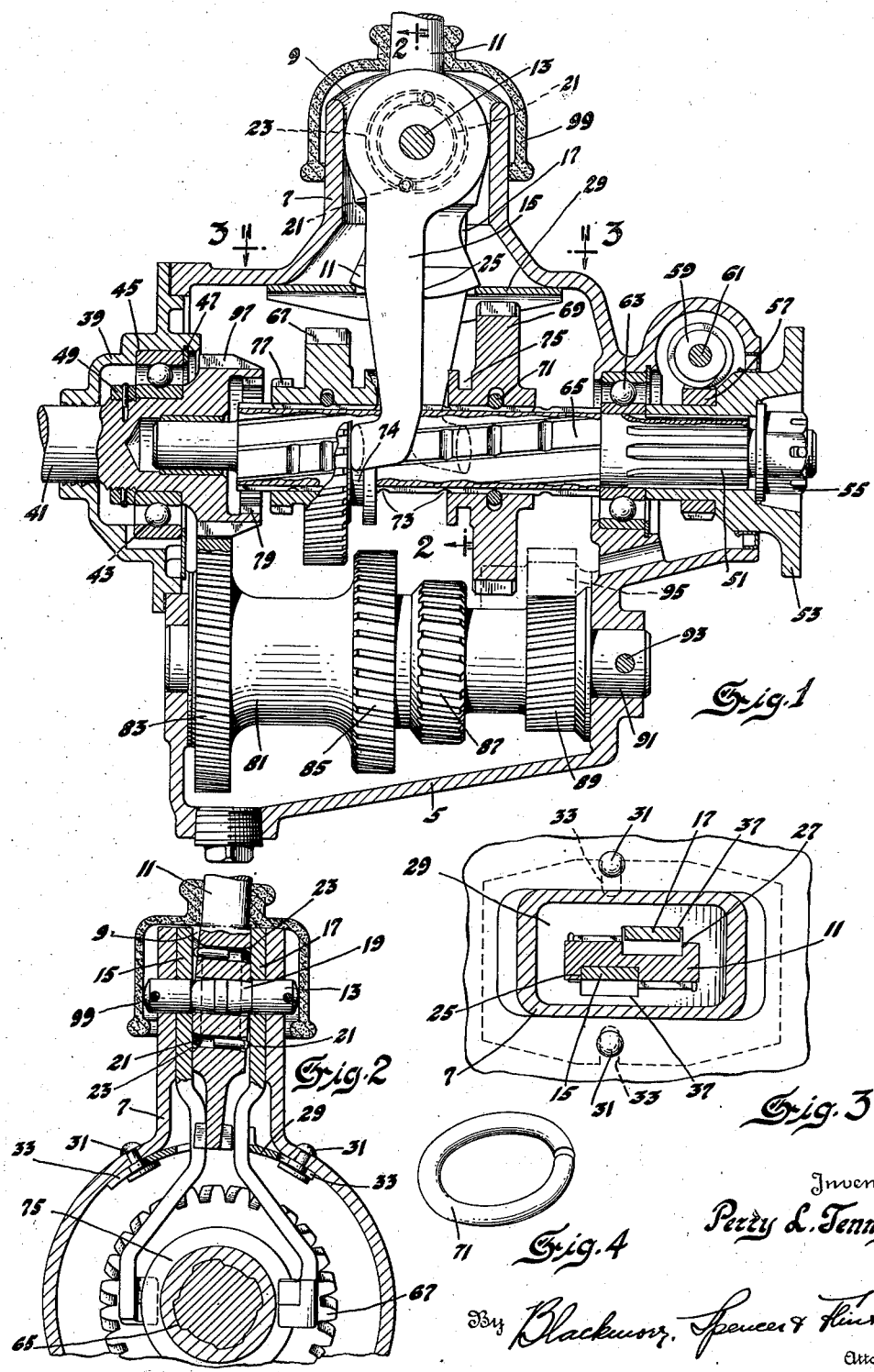

2,101,765

UNITED STATES PATENT OFFICE 2,101,765

AUTOMOTIVE TRANSMISSION

Perry L. Tenney, Lansing, Mich., assignor to General Motors Corporation, Detroit, Mich., a corporation of Delaware Application January 22, 1934, Serial No. 707,663

4 Claims. (Cl. 74—477)

This invention relates to power transmission and has been designed for use on motor vehicles to provide a plurality of driving ratios.

An object of the invention is to simplify the assembly of gears in a housing to the end of reducing the cost of manufacture.

Another object is to provide a construction wherein conventional shifting rods between the shift lever and sliding gears may be omitted.

Other objects and advantages will be understood from the following description.

In the drawing:

Fig. 1 is a longitudinal section of the transmission assembly.

Fig. 2 is a section on line 2—2 of Fig. 1.

Fig. 3 is a section on line 3—3 of Fig. 1.

Fig. 4 shows a detent device in perspective.

Referring by reference characters to the drawing, numeral 5 is a gear housing. The top of the housing as at 7 is formed as an integral part thereof, not separable as is the usual practice. It has an opening at 9 to receive the shift lever 11, the latter being inserted from above through the opening 9 as will be seen. A pivot pin 13 is passed through openings in the top part 7 and is secured as shown in Fig. 2. It pivotally supports shift members 15 and 17. The pin is tapered as at 19 from its mid portion for a little way toward each end. The lever 11 encompasses these tapered regions to permit transverse tilting between the members 15 and 17. Circular springs 21 are located in grooves 23 in opposite faces of lever 11, one end of each spring being inserted in a transverse opening in the lever as shown by Fig. 2. The springs resiliently position the lever and prevent rattling. The lower end of the lever 11 has recesses 25, 27 to receive therein intermediate parts of the one or the other of members 15 and 17 when the lever is transversely shifted. After being so engaged a longitudinal rocking movement of the lever will similarly rock the engaged member to effect gear movements for ratio changing. The lever end passes through an interlocking plate 29 guided by pins 31 carried by the housing for permitting transverse movement only. These pins engage the walls of slots 33 as shown by Fig. 3. The plate 29 has an opening with notches 37 for receiving that one of the members (17 in Fig. 3) not engaged by the lever 11. The member locked by plate 29 is held from longitudinal movement, but the other member, freed from locking engagement by the transverse movement of plate 29 and the lever 11, may be rocked longitudinally about its rotary support on pin 13. The dimension, longitudinally, of the opening in plate 29 and the shape of the lower end of lever 11 are designed to permit the above movements.

The transmission housing 5 has a single removable cover 39 through which passes the input shaft 41. A suitable bearing 43 is provided therefor, the outer race of which is held against a shoulder 45 in the cover by a retaining ring 47 and the inner race of which is held against a shoulder of shaft 41 by a threaded ring 49. Through the other end of the housing projects a driven or output shaft 51 carrying a coupling member 53 splined thereto and held axially by a nut 55. The member 53 may be equipped with a pinion 57 to drive a gear 59 on a shaft 61 mounted in casing 5. This is for connection with a speedometer. Inwardly of the speedometer drive gearing is a bearing 63 between the housing 5 and shaft 51. At its front end the shaft 51 is piloted into a recessed end of input shaft 41 as usual.

The output shaft is formed with helical splines 65 for helical gears 67 and 69 whereby the gears may be reciprocated on the splines. Internally, gears 67 and 69 have channels to receive resilient detent locking rings 71 one of such rings being shown in perspective in Fig. 4. The splines on shaft 65 are provided with grooves 73 into which the rings 71 snap as the gears are reciprocated to positions according to neutral or predetermined gear ratios. The members 15 and 17 engage collars 74 and 75 on gears 67 and 69. Gear 67 is also formed with clutch teeth 77 to engage internal teeth 79 on the end of input shaft 41. A spool-like countershaft 81 with helical gears 83, 85, 87 and 89 is rotatable on spindle 91 projected through openings therefor in the housing and secured by fastening means 93. As usual a reverse idler indicated by numeral 95 meshes with gear 89.

Helical gear 97 on the input shaft 41 is in constant driving engagement with the gear 83 on the countershaft. For direct driving clutch 77 is moved into mesh with teeth 79 by forward reciprocation of gear 67. Rearward reciprocation of 67 brings it into mesh with countershaft gear 85 for second speed driving. For low speed, gear 69 is moved forward into mesh with countershaft gear 87 and for reverse, gear 69 is moved to engage gear 95 which is in constant engagement with gear 89. The helical splines cooperate with the helical teeth to facilitate gear meshing.

One important feature of the invention resides in the simplicity of the housing and its low cost of production made possible by the manner in which the parts are to be assembled. The countershaft spool may be inserted through the opening normally closed by cover 39. When dropped into position the spindle 91 is extended through the spool and secured in position. The reverse idler is also assembled by insertion through the front opening. The output shaft 51 with member 53 may be projected forwardly through the rear housing opening and the gears 69 and 67 previously passed through the front opening are slipped upon the splines of the shaft. When the members 15 and 17 and the lever 11 have been projected through the opening 9 and the members engaged with the collars of the gears, the pin 13 may be assembled through the openings of the fork and lever and secured in position. The input shaft after assembly with the cover 39 may be projected into the front opening, its gear 97 moved into mesh with gear 83 and the recessed end of the shaft engaged with the reduced end of shaft 51. The securing of the cover completes the assembly. Preferably the lever 11 may carry a cup-shaped protecting cover 99.

I claim:

1. In combination, a transmission housing, movable power-transmitting ratio changing members in said housing, a pivot pin extended transversely of and within said housing, shift elements rotatably supported on said pin and engaging said members, a manually operable lever mounted on said pin for both longitudinal and transverse rocking movements, said lever having parts to engage the one or the other of said elements by its transverse movements and to thereafter rock said engaged element by its longitudinal rocking movement.

2. In combination, a transmission housing, movable ratio changing members in said housing, a pivot pin extended transversely and within said housing, shift elements rotatably supported on said pin and engaging said members, a manually operable lever mounted on said pin for both longitudinal and transverse rocking movements, said lever having parts to engage the one or the other of said elements by its transverse movements and to thereafter rock said engaged element by its longitudinal rocking movement together with an interlocking plate, means to restrict said plate to transverse movements only, said plate having a slot, the walls of said slot engaged by said manually operable lever whereby said plate is transversely shifted by transverse rocking of said lever, said slot shaped to lock the element released from engagement with the lever.

3. In a change speed mechanism for vehicles including a housing and axially movable power-transmitting members therewithin, an actuating sub-assembly comprising elements engageable with said members and a shift lever, a common fulcrum pin for said lever and elements, said pin being mounted within and transversely of said housing.

4. In a change speed mechanism for vehicles including a housing and axially movable members therewithin, an actuating sub-assembly comprising elements engageable with said members and a shift lever, a common fulcrum pin for said lever and elements, said pin being mounted within and transversely of said housing, there being two of said elements, the shift lever being fulcrumed between said elements on said fulcrum pin and shaped to rock transversely to engage the one or the other of said elements, together with an interlocking plate, means to mount said plate for transverse movement by like movements only, said interlocking plate and shift lever having engaging parts whereby the shift lever in its transverse movements may move the locking plate, said plate adapted when so moved to engage and lock one of said elements from longitudinal movement.

PERRY L. TENNEY.